Figure 1:
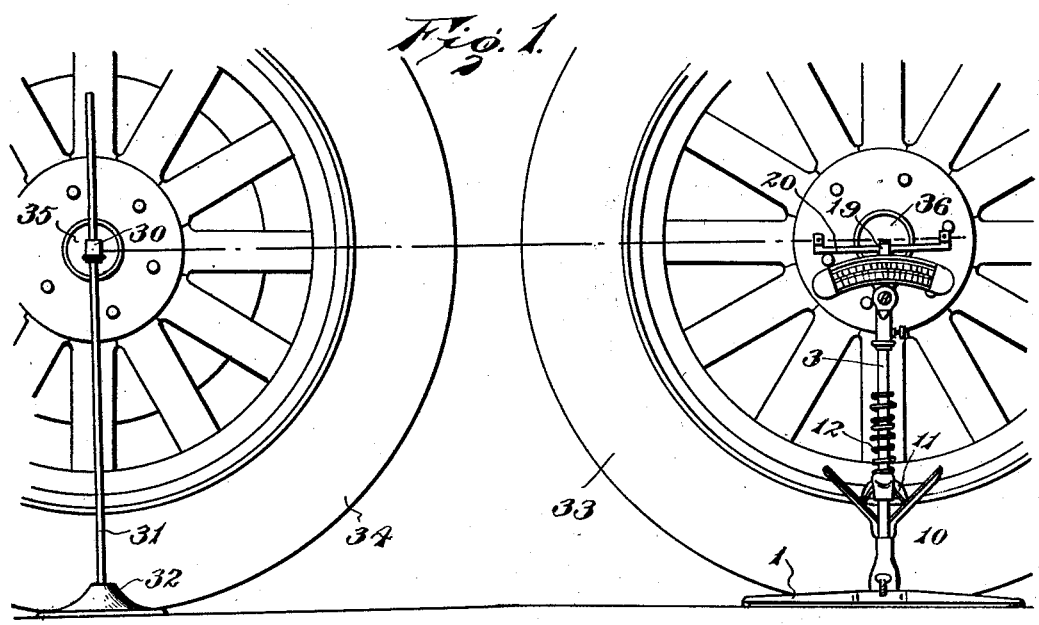

Dec. 22, 1931.    C. H. PHELPS    1,837,670
TOOL FOR MEASURING THE CASTERS OF AXLES
Filed Aug. 12, 1929    2 Sheets-Sheet 1

Inventor
C. H. Phelps
By Lacey & Lacey, Attorneys

Dec. 22, 1931.  C. H. PHELPS  1,837,670
TOOL FOR MEASURING THE CASTERS OF AXLES
Filed Aug. 12, 1929  2 Sheets-Sheet 2
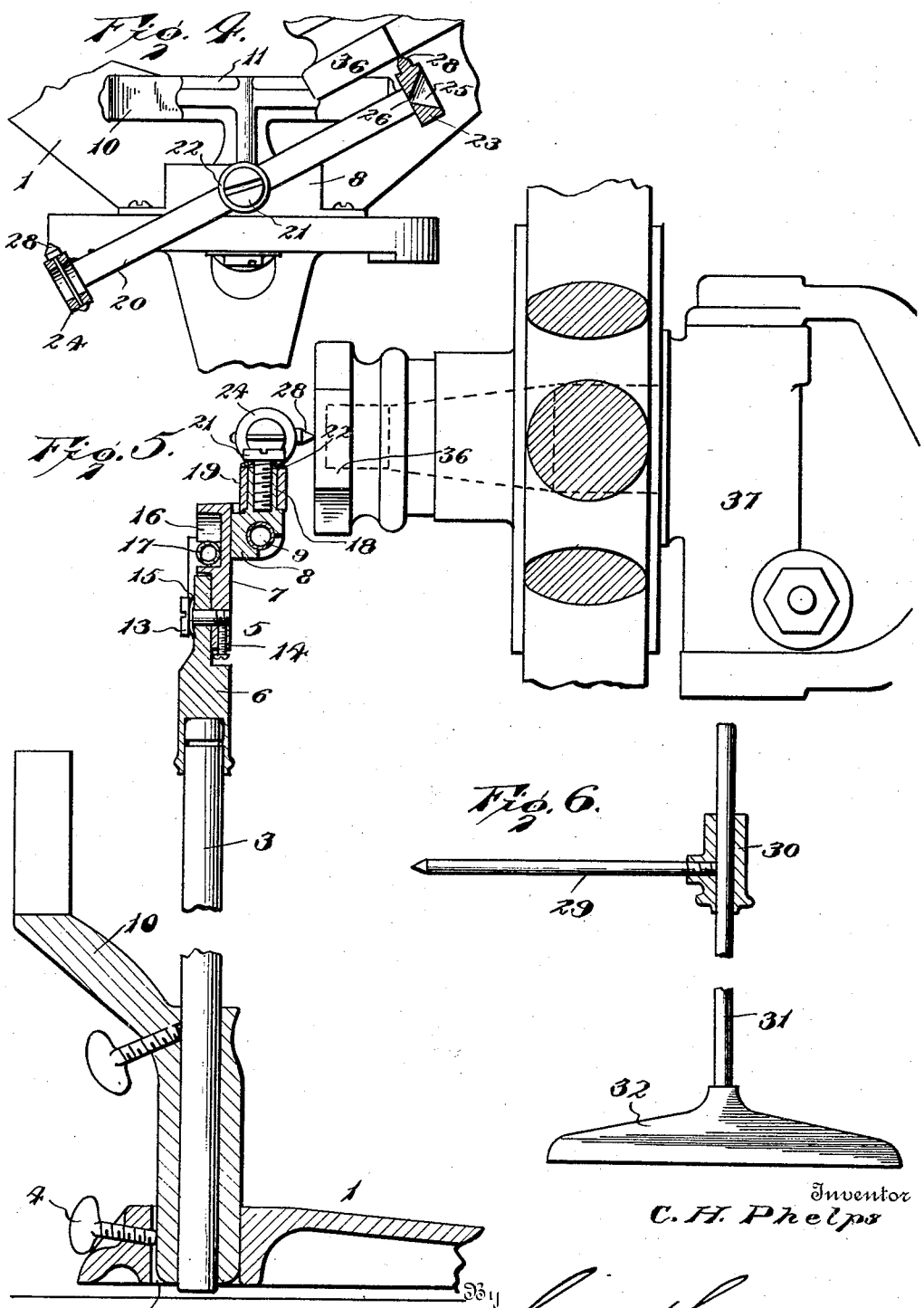
Inventor
C. H. Phelps
By
Lacey & Lacey, Attorneys Patented Dec. 22, 1931

1,837,670

UNITED STATES PATENT OFFICE

CLYDE H. PHELPS, OF MOUNT VERNON, NEW YORK, ASSIGNOR, BY MESNE ASSIGNMENTS, TO HIMSELF AND F. E. ARRIGONI

TOOL FOR MEASURING THE CASTERS OF AXLES

Application filed August 12, 1929. Serial No. 385,353.

In order that motor vehicles may be easily steered, it is the practice to set the front axles in a somewhat tilted position so that the king pins or vertical members of the spindles carrying the front wheels will be tilted likewise longitudinally of the vehicle and the wheels caused to run in a manner similar to caster wheels and respond quickly to movements of the steering gear. As long as the axle and the steering wheel spindles remain in the same position in which they were originally set, the vehicle will steer easily and will not impose excessive strain upon the chauffeur to maintain the wheels in the proper position and avoid "shimmying" or lateral oscillation or vibration when traveling over rough roads, but after the vehicle has been in use for a considerable period the springs frequently become deformed or shift in their seats upon the axle so that the caster or tilt of the axle is changed, the result being that the wheels do not run true. It is the object of the present invention to provide a device for accurately measuring the caster or tilt of the axle and king pin so that by comparison of the same with the specifications issued by the builder of the particular vehicle it will be known positively to what extent readjustment is necessary. In the case of relatively slight shifting from the standard caster, the proper caster may be restored by inserting wedges under the body-supporting springs but if the spring is badly deformed it will be necessary to substitute new springs. The invention is illustrated in the accompanying drawings and will be hereinafter fully set forth and defined.

Figure 2:
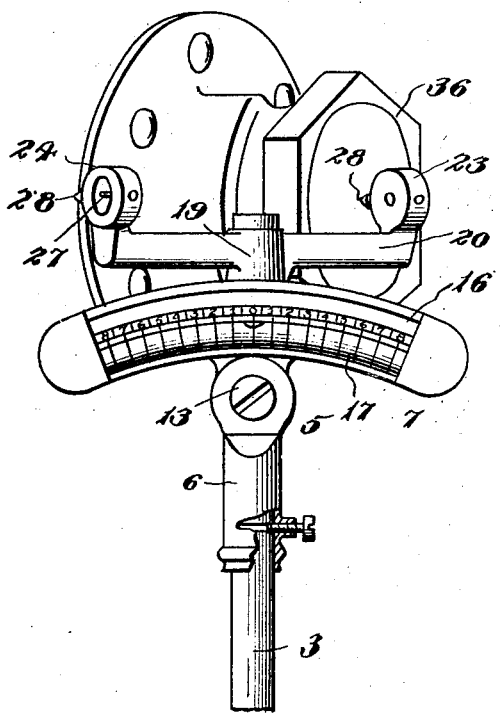
Figure 3:
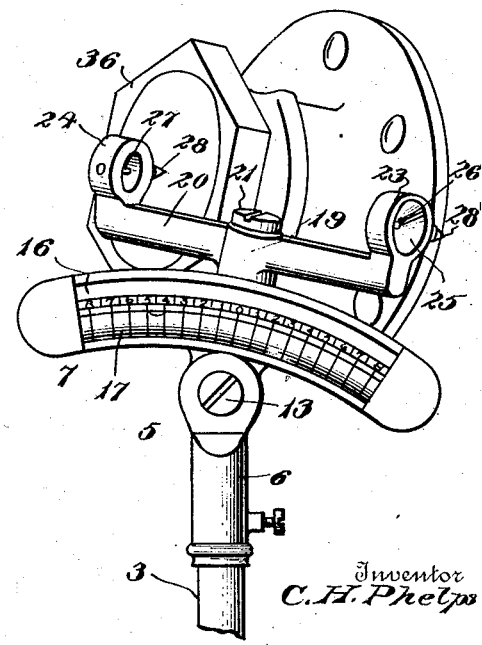

In the drawings:

Figure 1 is a front elevation of apparatus embodying the present invention, showing the same arranged to determine whether or not the two axles of the vehicle are in the same horizontal plane, Fig. 2 is an elevation showing the caster-measuring instrument in one position, Fig. 3 is a similar view showing a second position of the tool, Fig. 4 is a top plan view, with parts in section, all the parts being in the position illustrated in Fig. 2, Fig. 5 is an enlarged sectional elevation of the tool in engagement with the hub of a wheel, and Fig. 6 is a sectional elevation of a gage or sighting pole which is used in connection with the tool when testing the horizontal alinement of the two axles.

In carrying out the present invention, there is provided a base 1 which is preferably a three-armed casting of sufficient weight to remain steady in the place in which it may be set for use. At the junction of the several arms of the base, an opening 2 is formed therethrough and a shank or post 3 has its lower end fitted in said opening and adapted to be secured in any convenient manner, as by the use of a set bolt 4. Upon the upper end of the post 3 is swiveled a head 5 consisting of a socket member 6 directly encircling the end of the post, and an indicator bar 7 pivoted to the side of the socket member at the upper extremity of the same. Upon the rear side of the bar 7 is secured a tubular body 8 containing a spirit level 9, the head and the body or block 8 being the same in all essential respects as the structure disclosed in an application for patent on a tool for measuring the camber of wheels, Serial No. 298,006, filed by me August 7, 1928. Adjustably fitted upon the post is a fork 10 and a cooperating fork 11 which is held to the fork 10 by an expansion spring 12 fitted about the post and operating in an obvious manner, these parts being also fully shown and described in my aforesaid application, so that the present tool may be utilized for measuring the camber of wheels just as described in said application.

It will be noted upon referring particularly to Fig. 5, that the indicator bar 7 and the socket member 6 are flat sided at their point of pivotal connection and the pivot bolt 13 has a smooth shank passing through the socket member but is threaded into the indicator bar so that the bar will be held firmly to the socket member, and to further guard against the withdrawal of the pivot bolt a set screw 14 is inserted through the edge portion of the indicator bar and turned home against the pivot bolt, as clearly shown. A spring washer 15 is fitted around the bolt between the head of the same and the socket member to bear upon the socket member and thereby hold it in frictional engagement with the indicator bar so that the bar will remain in any position in which it may be set. Upon referring to Figs. 2 and 3, it will be noted that the indicator bar 7 is arcuate in form and the center of the bar is alined radially with the pivot bolt. The bar is recessed in its outer face, as shown most clearly at 16 in Fig. 5, and in the recess or chamber thus provided there is secured a spirit level 17 also of arcuate form and having degrees marked upon its surface, the zero point being at the center or normally high part of the arc so that, when the level is in such a position that its two ends are in the same horizontal plane, the zero point will be vertically over the end of the post and the bubble in the liquid within the tube will be at zero. Upon the upper side of the block or body 8, at the center of the same, a hollow post 18 is provided having a threaded bore, and about this post is pivotally fitted the central hub portion 19 of a straight bar 20 which extends equal distances to the opposite sides of the hub, a retaining bolt 21 being engaged in the post 18 and a spring washer 22 being fitted around said post under the head of the bolt to maintain the bar in frictional engagement with the hub and the block 8 so that the bar will remain in the position in which it may be set. At each end of the bar 20 is provided a ring 23 or 24 whereby the bar constitutes a transit for use in ascertaining whether the two axles of the vehicle are in the same horizontal plane. One of said rings, 23, has its inner circumference tapered from its outer side towards its inner side, as shown at 25, so that a very small sight opening 26 will be formed through the inner side of the ring. The two rings 23 and 24 are of the same diameter and are preferably formed integral with the bar 20 so that they will be in exact axial alinement. The inner circumference of the ring 24 is disposed concentric with the outer circumference of the same so that a straight bore is given said ring and extending across the ring on its horizontal diameter is a hair line or sight wire 27 which, of course, is directly alined with the sight opening 26. On the outer circumference of each said rings, at the side remote from the indicator bar, is a spur 28, the purpose of which will be presently stated.

Employed in connection with the transit is a gage or sight bar 29 which has one end threaded into a socket member 30 slidably fitted upon a post 31 rising from a substantial base 32.

In Fig. 1, the apparatus is shown in connection with a front wheel 33 and a rear wheel 34. In testing the caster of the front axle, it is essential that the two axles be in the same horizontal plane or it be accurately known to what extent a plane passing through the two axles varies from the horizontal. For this purpose, the parts are arranged, as shown in Fig. 1, the post 31 being disposed adjacent the rear wheel and the gage bar 29 adjusted vertically on said post until the free end of the rod may be caused to touch the exact center of the hub cap 35 of the rear wheel. The base 1 and the parts carried thereby are set adjacent the front wheel and the post 3 is adjusted vertically so that the center hub 19 of the bar 20 has the upper end or side of the head of its retaining bolt alined with the center of the hub cap 36 of the front wheel. The operator then sights through the rings 23 and 24 and shifts the indicator bar 7 about its pivot 13 until the hair line 27 registers or alines with the gage rod 29. If the two axles are in the same horizontal plane, the bubble in the level 17 will be at the zero point and the bar 20 will be in a horizontal plane. If, however, it has been necessary to shift the bar 20 pivotally in order to impose the hair line 27 in the range of vision between the sight opening 26 and the gage rod 29, the departure from the horizontal will be noted by the position of the bubble in the level 17 which may be at either side of the zero point, the block 8 being fixed to the indicator bar 7 so that all of the parts above the pivot bolt 13 will move as an entirety. If the axles are not in the same horizontal plane, the variation should be noted to be subsequently deducted from the measurement acquired in testing the caster of the axle or king pin. The primary test just described having been completed, the bar 20 is set in a horizontal plane, as shown in Figs. 1 and 2, and the front wheel is then shifted forwardly about the king pin, indicated at 37 in Fig. 5, until the center of the hub cap 36 is in position to be engaged by the spur 28 on the ring 23, as shown in Fig. 4. The wheel is then swung rearwardly, as will be understood upon reference to Fig. 3, and the gage bar 20 then swung about the post 18 until the spur 28 upon the ring 24 touches the hub cap at the center of the same. Inasmuch as the king pin is disposed on the same angle or tilt as the axle, the wheel, when shifting from the positon shown in Figs. 2 and 4 to the position shown in Fig. 3, will also swing upwardly or possibly downwardly, and in order to bring the ring 24 against the hub cap it will be not only necessary to swing the bar 20 about the post 18 but to also rock the bar 7 about its pivot 13. The rocking of the bar 7 will, of course, also rock the spirit level carried by the bar and the bubble will move to the high point of the level which may be at either side of the zero point, and the degree of inclination will denote the degree of inclination or caster of the axle and the king pin. By deducting the measurement noted in the first primary operation and then comparing the result with the specifications of the particular machine, it will be known to what extent the caster is amiss.

The tool is very simple in the construction and arrangement of its parts so that it may be produced at a low cost. It is easily manipulated and it has been found highly efficient in its results.

Having thus described the invention, I claim:

1. Means for the purpose set forth comprising a support, an indicator bar pivotally mounted on the support, a level carried by the bar, a second bar mounted on the first bar and pivoted for movement in a plane at a right angle to the plane of movement of the first-mentioned bar, the second-mentioned bar extending equi-distantly to the opposite sides of its pivot and provided at its ends with means for engaging a hub cap at the center thereof when the cap is turned with its wheel to positions at opposite sides of the center of the bar.

2. Means for the purpose set forth comprising a support, a head mounted thereon and pivoted for movement in a single plane, a level carried by the head, a block on a side of the head, and a bar pivotally mounted on said block and extending equal distances to the opposite sides of its pivot and provided at its ends with means for engaging a hub cap at the center of the cap when the cap with its wheel is turned to positions at opposite sides of the center of the bar.

3. Means for the purpose set forth comprising a post, a head pivotally mounted on the post, a level carried by the head, a bar pivotally mounted on a side of the head and extending equal distances from its pivot to the opposite sides of the pivot and provided at its ends with spurs adapted to alternately engage a hub cap when the cap with its wheel is turned to positions at opposite sides of the center of the bar.

In testimony whereof I affix my signature.

CLYDE H. PHELPS. [L. S.]